P. S. BAKER.
GROUND LEVELER AND MOISTURE RETAINER.
APPLICATION FILED JULY 31, 1913.
1,111,940.        Patented Sept. 29, 1914.
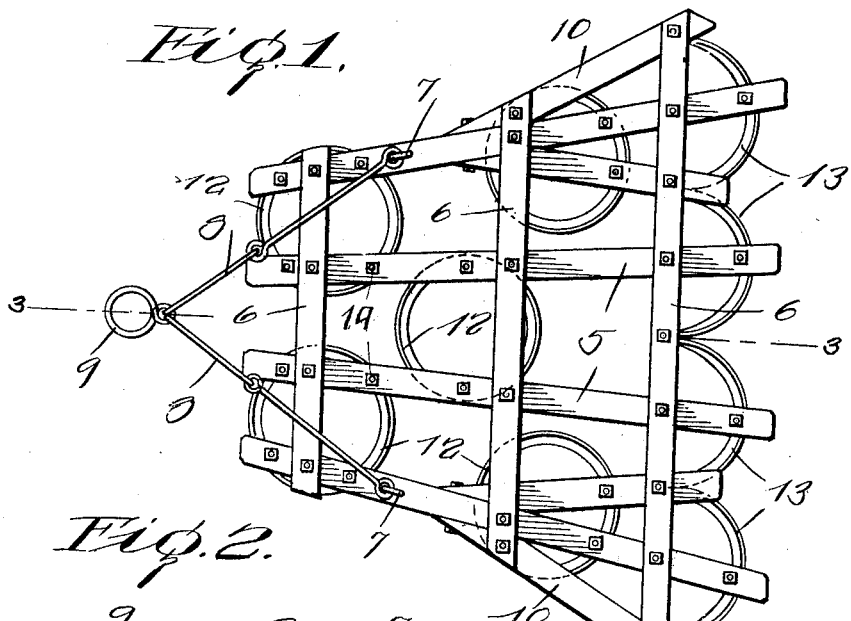
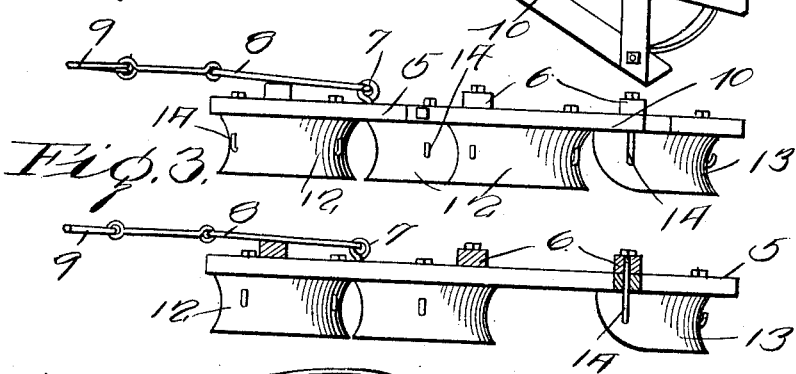
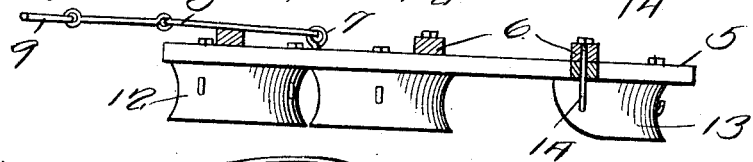
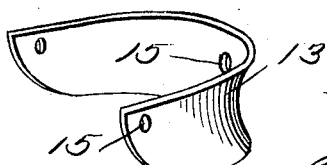
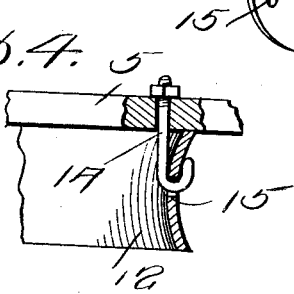
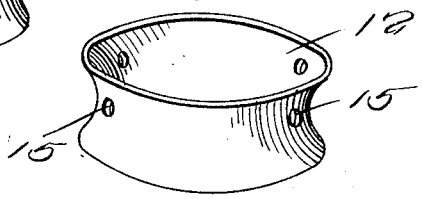
P. S. Baker, Inventor
Witnesses
Frank S. Ratcliffe
By Chandler & Chandler
Attorneys

UNITED STATES PATENT OFFICE.

PETER S. BAKER, OF LOGANSPORT, INDIANA.

GROUND-LEVELER AND MOISTURE-RETAINER.

1,111,940.     Specification of Letters Patent.      Patented Sept. 29, 1914.

Application filed July 31, 1913. Serial No. 782,273.

*To all whom it may concern:*

Be it known that I, PETER S. BAKER, a citizen of the United States, residing at Logansport, in the county of Cass, State of Indiana, have invented certain new and useful Improvements in Ground-Levelers and Moisture-Retainers; and I do hereby declare the following to be a full, clear, and exact description of the invention, such as will enable others skilled in the art to which it appertains to make and use the same.

This invention relates to new and useful improvements in agricultural implements and has particular reference to machines for working soil.

The object of the present invention resides in the provision of a machine which will break up the ground and level the same and which will then pack the ground in the manner of a roller so that moisture will be retained therein.

A further object resides in the provision of a machine of the class described which is capable of performing a number of functions, such as covering potatoes or grain planted in the ground performing the work of a corn stalk breaker and serving efficiently as a road grader and scraper.

A still further object of the machine is to provide such a machine which is compact in structure and simply proportioned so that it may be manufactured at a comparatively low cost.

With these and other objects in view, the invention resides in the novel combination, formation and arrangement of parts to be more fully hereinafter described and illustrated in the accompanying drawings and particularly pointed out in the claims hereto appended.

Reference is had to the accompanying drawings, wherein similar characters of reference designate corresponding parts throughout the several views, and in which:

Figure 1 is a top plan view of the improved machine, Fig. 2 is a side elevational view thereof, Fig. 3 is a vertical longitudinal sectional view therethrough taken on the line 3—3 of Fig. 1, Fig. 4 is a detail view of the method of connecting the ground working elements to the frame, Fig. 5 is a perspective view of one of the forward ground working elements, and Fig. 6 is a perspective view of one of the rear ground working elements.

Referring now more particularly to the drawings, the frame-work of the improved machine comprises a plurality of longitudinally extending bars 5 spaced apart and slightly converging at their forward ends, said bars being connected by a plurality of transversely extending spaced parallel bars 6 disposed over and secured to the first-mentioned bar. Secured to eyes 7 on the forward ends of the outer bars 5 are series of links 8, the outer end of each series being secured to a clevis ring 9 to form an equalizer element. Secured to the intermediate portion of each outer longitudinal bar 5 are a pair of bars 10 which diverge outwardly therefrom and from each other for supporting the rear ground working members.

The ground engaging members 12 for breaking up the ground comprise each an annular band having its edges flared outwardly so that a cross sectional view of the band is substantially arcuate. These members are secured on the bottom face of the frame in staggered relation so that they engage the whole of the ground over which the machine passes. For rolling and packing the dirt which is not packed by the rear portion of the bands 12, a plurality of semi-circular members 13 are provided having a substantially arcuate cross section and disposed in a line at the rear of the machine with their central portions to the rear and their side edges abutting. The side edges of these members are beveled so that they do not disturb the earth packed by the member 12. The means for securing these members 12 and 13 to the frame comprise a plurality of bolts 14 having hooks at their lower ends engaged in openings 15 in the members and having their upper ends passed through the adjacent portion of the frame work and held by a nut threaded thereon.

This device is highly efficient in operation and capable of performing a variety of functions. When it is dragged over the ground to break up the soil and pack the same to retain moisture in the ground, the forward portion of the member 12 cuts the clods and lifts them into the interior of the members where they roll about until they drop into a depression or else are broken up and pass under the rear portion of the band, which pulverizes the same and presses them. Those clods which escape the bands 12 are caught by the semi-circular members 13 and rolled into depressions or pulverized and pressed so that after the machine has passed over the ground it is provided with a coat of pulverized soil packed down to maintain the moisture. It is thus seen that this machine is valuable for covering grain and potatoes which are planted in the ground.

What is claimed is:

1. An agricultural machine comprising a frame and a plurality of annular members depending therefrom with their axis disposed vertically and the lower ends of said members being flared outwardly.

2. An agricultural machine comprising a frame, a plurality of annular members depending therefrom with their axis disposed vertically and a plurality of arcuate members disposed in a line at the rear of the machine and having their side edges abutting and the lower ends of all of said members being outwardly flared.

3. An agricultural machine comprising a plurality of longitudinal bars, a plurality of transverse bars, a plurality of annular members disposed thereunder with their axis disposed vertically and provided with spaced openings and bolts passed through the bars and terminating in hooked portions engaging the openings to hold the said members to the frame.

4. A ground working implement comprising an annular band having its edges outwardly flared.

5. A ground working implement comprising an annular band having its side edges outwardly flared, the axis of said implement adapted to be disposed vertically, the forward portion of the lowermost flared edge being adapted to cut the earth and direct it to the interior of the band and the rear portion of said edge being adapted to pulverize the earth and pack it.

In testimony whereof, I affix my signature, in the presence of two witnesses.

PETER S. BAKER.

Witnesses:
SYLVESTER L. TAYLOR,
ANTHONY F. MCCAFFREY.

---

Copies of this patent may be obtained for five cents each, by addressing the "Commissioner of Patents, Washington, D. C."